United States Patent
Zoppas et al.

(10) Patent No.: US 10,836,087 B2
(45) Date of Patent: Nov. 17, 2020

(54) PROCESS TO COAT AN INJECTION MOULD

(71) Applicant: S.I.P.A. Societa' Industrializzazione Progettazione E. Automazione S.P.A., Vittorio Veneto (IT)

(72) Inventors: Matteo Zoppas, Conegliano (IT); Laurent Sigler, Boust (FR); Marc Hoang, Luxembourg (LU)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 281 days.

(21) Appl. No.: 15/773,859

(22) PCT Filed: Nov. 7, 2016

(86) PCT No.: PCT/EP2016/076886
§ 371 (c)(1),
(2) Date: May 4, 2018

(87) PCT Pub. No.: WO2017/077129
PCT Pub. Date: May 11, 2017

(65) Prior Publication Data
US 2019/0160720 A1  May 30, 2019

(30) Foreign Application Priority Data

Nov. 6, 2015 (IT) .......................... 102015000070022

(51) Int. Cl.
*B29C 33/56* (2006.01)
*B29C 45/37* (2006.01)
(Continued)

(52) U.S. Cl.
CPC ............ *B29C 45/37* (2013.01); *B23P 15/007* (2013.01); *B29C 33/38* (2013.01); *B29C 33/56* (2013.01); *C23C 4/08* (2013.01); *C23C 4/18* (2013.01)

(58) Field of Classification Search
CPC ................................ B29C 45/37; B29C 33/56
See application file for complete search history.

(56) References Cited

U.S. PATENT DOCUMENTS 2,541,954 A * 2/1951 Bonnet ..................... B44B 3/00
205/152
3,948,309 A * 4/1976 Cordone ............ B22D 19/0009
164/98

(Continued)

FOREIGN PATENT DOCUMENTS

GB          1276546          6/1972

*Primary Examiner* — Timothy Kennedy
(74) *Attorney, Agent, or Firm* — Stetina Brunda Garred & Brucker

(57) ABSTRACT

A process to increase the diameter of a core rod (1) of an injection mould for preforms, wherein the core rod (1) has a moulding surface (2) divided in a neck finish portion (3) and a preform body portion (4), comprises the steps of: a) grinding or milling a layer from the surface of the preform body portion (4) of the core rod, b) depositing a metallic compound onto the ground portion to make a coating, c) removing the excess of coating material to bring the coated surface to a predetermined superficial roughness and to diametrical dimensions greater than the original surface profile (14) to reduce the thickness of the lateral wall of the moulded preform.

12 Claims, 3 Drawing Sheets

(51) Int. Cl.
    *B23P 15/00*     (2006.01)
    *B29C 33/38*     (2006.01)
    *C23C 4/08*     (2016.01)
    *C23C 4/18*     (2006.01)

(56) References Cited

U.S. PATENT DOCUMENTS

| | | | |
|---|---|---|---|
| 2003/0088980 A1* | 5/2003 | Arnold | F01D 5/288 29/889.1 |
| 2010/0092711 A1 | 4/2010 | Orden et al. | |
| 2014/0306090 A1 | 10/2014 | Hsu | |

* cited by examiner

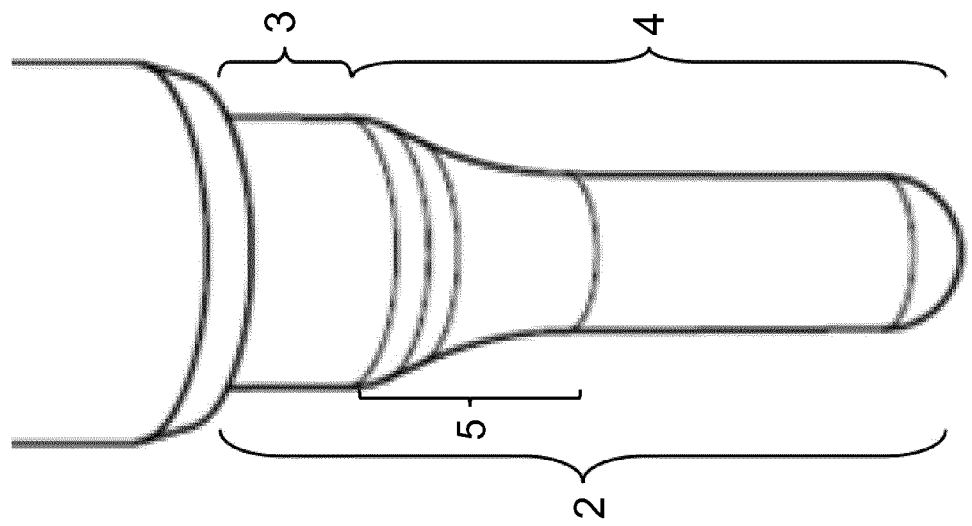
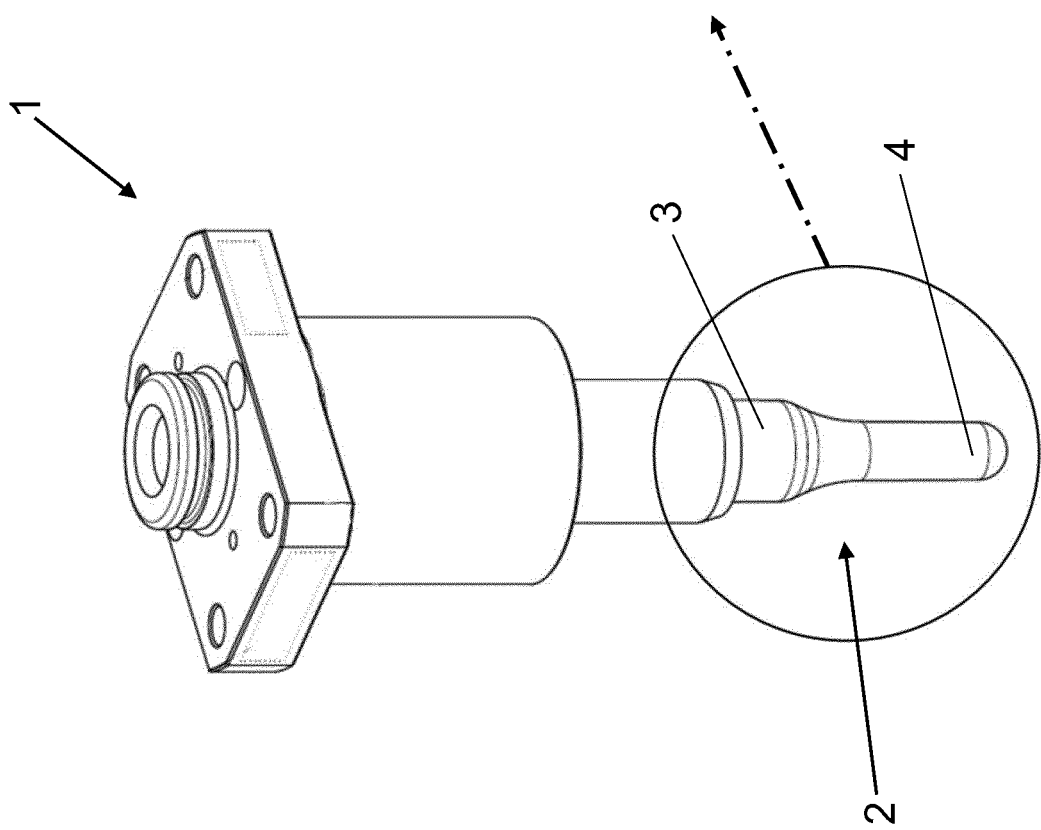

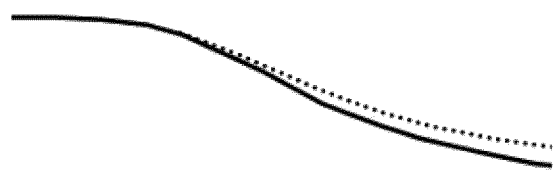
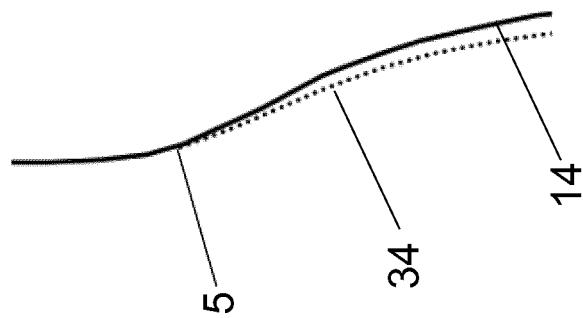
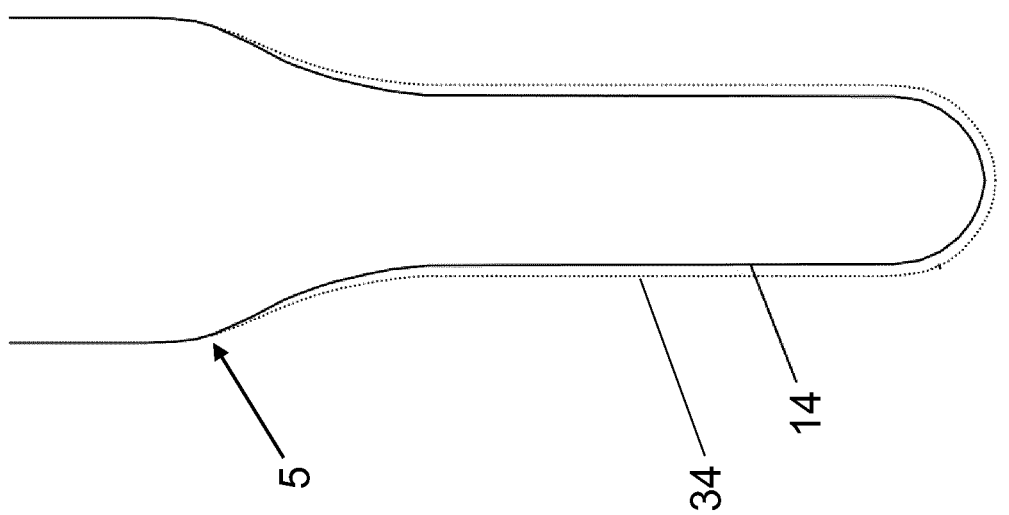

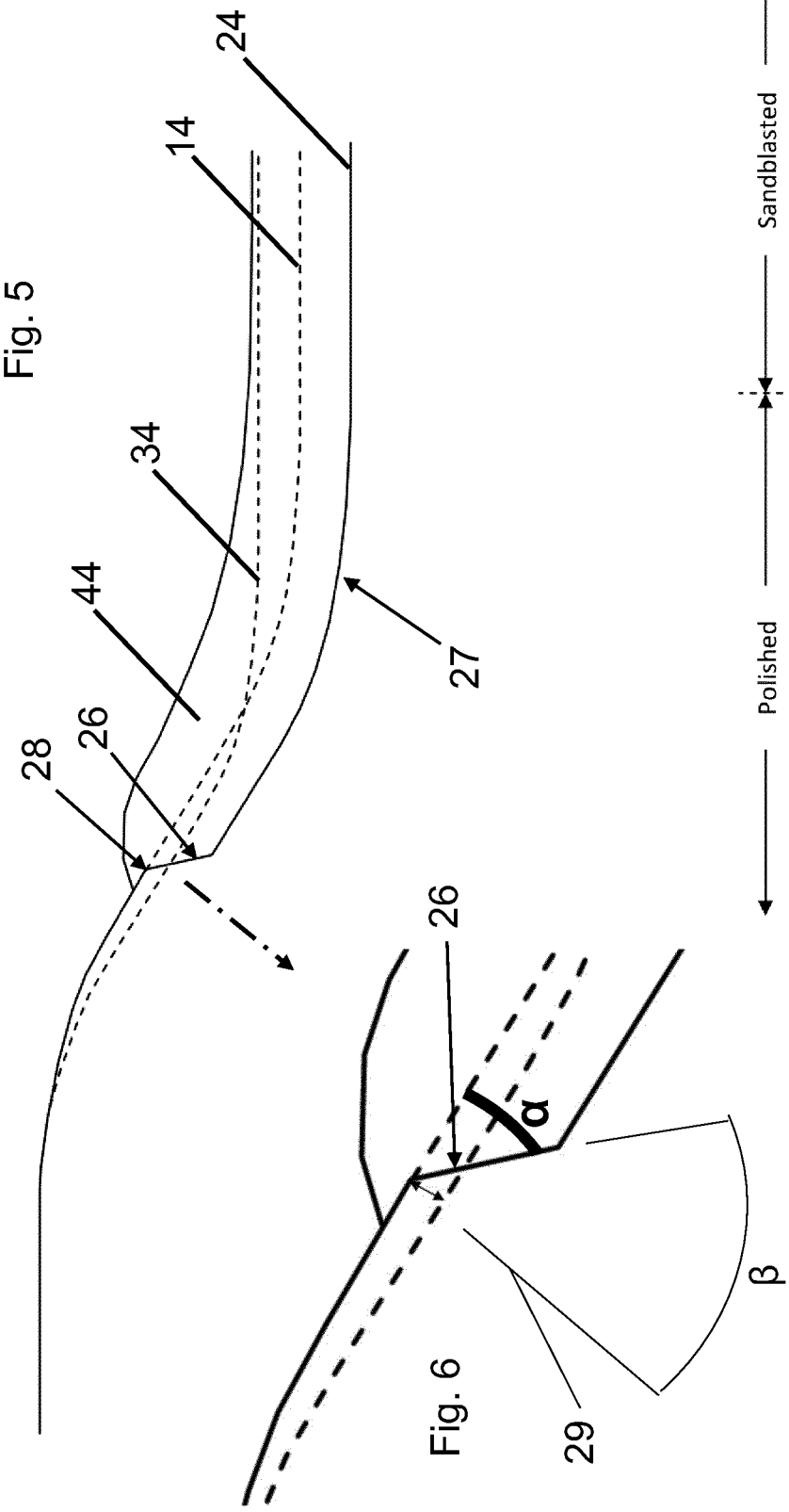

PROCESS TO COAT AN INJECTION MOULD

CROSS REFERENCE TO RELATED APPLICATION(S)

The present application claims priority to PCT International Application No. PCT/IB2016/076886 filed on Nov. 7, 2016, which application claims priority to Italian Patent Application No. 102015000070022 filed Nov. 6, 2015, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a process to produce core rods for moulds for injecting plastic preforms.

STATE OF THE ART

Preforms for plastic containers, such as bottles, are typically produced by injection moulding. This process involves the use of a mould, also known as female mould, defining a moulding cavity, and of a core rod, also known as core. In order to produce a preform, molten plastic is injected into the mould around the core rod. The wall thickness of the preform is substantially defined by the gap between the mould and the core rod. In particular, the smaller is the gap the smaller is the wall thickness. For economic reasons, the line followed by the manufacturers of plastic bottles and containers is to reduce as much as possible the weight, and therefore the amount of plastic used. To achieve this result it is necessary to make preforms with thinner walls. This means that the gap between the mould and the core rod has to be selected according to the desired wall thickness. Only in the recent years the technology has reached a capability to make preforms with thinner walls for producing lighter final blown containers with high technical performances. However, preform manufacturers have at their disposal a large number of moulds and core rods configured to produce preforms with relatively thick walls. In order to produce thin walled preforms, preform manufacturers must acquire new injection moulds which entails considerable capital investment costs. A possible solution which reduces investment costs is to replace the whole plate holding the multiplicity of core rods while keeping unchanged the other plate forming the other semi-mould holding the corresponding multiplicity of cavities. The new semi-mould is equipped with core rods having larger diameters, which as a result reduces the thickness of the preform walls. This replacement operation of existing preform injection moulds is rather costly and time consuming.

Therefore, the need is felt to obtain core rods adapted to produce thin walled preforms, in a faster and less expensive way.

SUMMARY OF THE INVENTION

An object of the present invention is to provide a fast, cheap and effective process to modify a pre-existing core rod.

The invention reaches this and other objects that will be apparent in light of the present description by means of a process, to make a core rod for preforms, wherein there is provided a core rod having an external moulding surface being a shaping surface of an internal surface of a preform and comprising a neck shaping portion and a body shaping portion, the body shaping portion having first diametrical dimensions, a metallic compound, depositing means to deposit said metallic compound onto the core rod, and chip removal means, the process comprising the steps of:

a) removing an outer layer of a predetermined first thickness from the body shaping portion by means of the chip removal means to obtain an intermediate surface;

b) depositing a layer of said metallic compound of a second thickness greater than said first thickness onto the intermediate surface to obtain a coating, c) performing a surface finishing operation to remove excess of coating material and/or to bring the surface of the coating to a predetermined superficial roughness, whereby the body shaping portion is provided with a coating of said metallic compound so that the core rod has a final body shaping portion with second diametrical dimensions greater than said first diametrical dimensions.

The invention also provides a core rod obtained by means of said process, having said neck shaping portion and said body shaping portion, wherein the body shaping portion is provided with said coating of said metallic compound. Preferably, all the body shaping portion is provided with said coating. Preferably, only the preform body shaping portion is provided with the coating, wherein the preform body shaping portion is configured to mould the body of the preform. Typically, the body of the preform is substantially cylindrical, and is provided with a hemispherical end or tip.

Advantageously, a pre-existing core rod, in particular its body shaping portion, is coated with a metallic compound whereby the size, or dimension, of the body shaping portion is increased due to the metal coating. In particular, the external diameter of the body shaping portion is increased. Preferably, the thickness of the metal coating ranges from 0.04 to 2.5 mm. Such thickness can be constant or gradually increase at least along a longitudinal portion of the core rod. In the last case, for example, it can gradually increase along a longitudinal portion proximal to the neck shaping portion to become constant for the remainder longitudinal portion.

Thanks to the invention, in order to produce a thin walled preform with a pre-existing female mould, it is not necessary to manufacture a new core rod. Indeed, as mentioned, a pre-existing core rod is modified with an extremely cheap, effective and fast process. By way of non-limiting example, a core rod is modified within few hours.

Of course, more than one core rod can be modified at the same time.

According to the invention, the metallic compound, i.e. the coating material, is carefully selected in order to satisfy at least one, preferably all, of the following criteria.

Preferably the material:

is at least equivalent to the base material or substrate, i.e. the material of the core, in terms of mechanical properties, such as hardness, fatigue resistance, surface finish etc.;

can strongly adhere onto the surface of the substrate in order to withstand a high number of injection cycles, e.g. 8 millions of injection cycles;

can resist to air and humidity i.e. it is stainless;
is approved by a health safety agency, such as FDA;
is adapted to be deposited by means of a method that does not unfavourably change the microstructure and the mechanical properties, e.g. hardness, of the substrate.

Preferably, but not exclusively, stainless steel is used as coating material since it is similar or identical to the substrate.

Generally, metallic compounds are preferred because of their good thermal conductivity and because their physical properties are usually similar to those of the substrate material, which typically is stainless steel.

In view of finishing operations, when selecting the coating material its machinability is also taken into account. In particular, it is preferred that the coating material is cost effectively machined using inexpensive tools.

With reference to such finishing operations, when a rotating tool is employed, such as during polishing, its rotational speed is selected in order to prevent undesired removal of the coating. The rotational speed is also selected so as not to cause delamination or to prevent making the coating too fragile. To the same end, the intended depth of the coating layer to be removed during this operation is preferably taken into account.

The dependent claims describe advantageous embodiments of the invention.

BRIEF DESCRIPTION OF THE DRAWINGS

Further features and advantages of the invention will become more apparent in light of the detailed description of preferred, but not exclusive, embodiments of a process for modifying a core rod, disclosed by way of a non-limiting example, with the aid of the accompanying drawings, in which:

FIG. 1 shows a core rod which can be modified by means of a process according to the invention;

FIG. 2 shows an enlarged detail of FIG. 1;

FIG. 3 schematically shows a portion of a core rod before and at the end of a process according to the invention;

FIG. 4 shows an enlarged detail of FIG. 3;

FIG. 5 schematically shows a profile of a portion of a core rod before the process of the invention, and at the end of different steps of the process of the invention;

FIG. 6 shows an enlarged detail of FIG. 5;

FIG. 7 schematically shows the portion of FIG. 5 at the end of a process according to the invention;

The same reference numbers in the figures identify similar elements or components.

DETAILED DESCRIPTION OF PREFERRED EMBODIMENTS OF THE INVENTION

With particular reference to FIG. 1 and FIG. 2, a pre-existing core rod 1 is shown, belonging to a semi-mould plate of the state of the art. As used herein, the term "pre-existing" indicates that the core rod 1 has been previously produced. Also, the term "original" that will be used in this description refers to a feature of the pre-existing core rod, and the term "final" is used to indicate a feature obtained at the end of the process.

The core rod 1 is normally made of stainless steel, and is provided with an external moulding surface 2, or portion, having the shape of the internal surface of the preform to be made, and it is configured to produce a preform, not shown, in cooperation with a mould defining a cavity, not shown as this is a well-known technology. The moulding surface 2 is provided with a neck shaping portion 3, or neck finish shaping portion, and a body shaping portion 4. The neck shaping portion 3 is configured to shape the neck portion, or neck finish portion, of the preform, and is preferably provided with features, e.g. protrusions, to make the thread of the neck. The body shaping portion 4 is configured to mould the body of the preform. The body shaping portion 4 is provided with a transition portion 5 adjacent to the neck shaping portion 3. Typically, the outer diameter of the neck shaping portion 3 is larger than the outer diameter of the body shaping portion 4. The transition portion 5 is at least partially tapered to connect the neck shaping portion 3 to the body shaping portion 4. Typically, the body shaping portion 4 terminates with a dome-shaped end, or hemispherical end tip, distal from the neck shaping portion 3, said dome-shaped end being configured to produce the bottom of the preform.

The invention provides a process to modify a pre-existing core rod 1, for example as described above, to make a modified core rod with greater size, or dimensions. The modified core rod is similar to the pre-existing core rod, and in particular has the same number and kind of portions. However, the body shaping portion of the modified core rod has greater diametrical dimensions, i.e. has larger diameter, with respect to the body shaping portion of the pre-existing core rod and fits into the same mould cavity provided for the pre-existing core rod.

According to a preferred embodiment of the invention, the process provides a modified core rod with an enlarged body shaping portion with respect to the body shaping portion of the pre-existing core rod. The body shaping portion is enlarged due to a metal coating, whereas the neck shaping portion is preferably not provided with a metal coating. FIG. 3 and FIG. 4 schematically and partially show a core rod, wherein reference numeral 14 indicates the original external surface 14 of the body shaping portion, and reference numeral 34 indicates the final, or modified, external surface, of the body shaping portion at the end of a process of the invention. FIG. 3 and FIG. 4 are provided for illustrative purpose, and represent a comparison between the pre-existing core rod and the final core rod. Indeed, as it will explained below, the metal compound is deposited on an intermediate surface. The original surface 14 has an original profile, and the final surface has a final profile. In order to carry out the process, a metallic compound, depositing means, not shown, to deposit the metallic compound onto the core rod and chip removal means, not shown, are involved.

In a first step, an outer layer is removed from the body shaping portion 4 by means of chip removal means. The thickness of the removed outer layer is preferably but not exclusively comprised between 0.2 and 0.5 mm, preferably between 0.2 and 0.3 mm The chip removal means can be for example, a grinder, a milling machine or incision means. Such means are preferably computer controlled. The milling machine or the incision means can be provided with suitable tools, for example tungsten carbide or diamond tools.

This step contributes to avoid delamination problems of the metal coating. Indeed, since the outer layer is removed, and having defined a final dimension of the body shaping portion, a thicker metal coating can be deposited onto the core rod. This avoids delamination of the metal coating which is likely to occur when the metal coating is too thin.

Preferably, the first step is performed so that, at its end, the core rod has an intermediate surface 24 having an intermediate profile (partially shown in FIG. 5 and FIG. 6) so that there is an intermediate portion of smaller diameter, i.e. smaller diametrical dimensions, than the original body shaping portion of the pre-existing core rod. Optionally, the outer layer is removed only from part of the body shaping portion 4. For example, in this first step, the part 25 is left unchanged, such part 25 being between the neck shaping portion 3 and the intermediate surface 24.

Optionally, the intermediate surface 24 has a first portion 26 and a second portion 27. The first portion 26, which preferably starts at a circumferential line 28 of the transition portion 5, is preferably inclined with respect to the original surface 14 by an angle α. In particular, the first portion 26 is tapered in a direction distal from the neck shaping portion 3. The angle of tapering, i.e. the angle α defined by the first portion 26 and the original surface 14, is comprised between 0 and 90°, and is preferably about 45°.

In other words, the first portion 26 is inclined of an angle β with respect to a line 29 perpendicular to a line, not shown, tangent to the original surface passing though the circumferential line 28 of the transition portion 5. Angle β is preferably comprised between 0 and 90°, and is preferably about 45°. Preferably, the second portion 27 of the intermediate surface 24 is substantially parallel to the original surface 14 of the pre-existing core rod.

In a second step of the process, in order to improve the adhesion of the metallic coating, a surface treatment of the intermediate surface 24 is performed. Preferably, a surface treatment to increase the roughness, and therefore the specific surface area available for adhesion, is performed, though not necessarily. To this end, by way of non-limiting example, sandblasting is a suitable technique.

In a third step of the process, the metal compound is deposited on the intermediate surface 24, by means of the depositing means. Preferably, the metallic compound is deposited also on the dome-shaped portion.

The metallic compound can be selected, by way of non-limiting example, among: Chromium steel, preferably stainless steel, Mo, CoCrW, NiCrMoW, NiCrMoNb, NiCrB-SiFe, WC—Co, WC—CoCr, Wc-Ni.

The depositing means are adapted to carry out a spraying or sputtering deposition of the metallic compound, which can be carried out, for example, at room or high temperatures, and high velocity gas stream. By way of non-limiting example, HVOF (High Velocity Fuel Oxygen) is a suitable deposition technique, since it can provide a coating with optimal mechanical properties, in particular with high density, strong adhesion to the pre-existing core rod, and very good resistance to wear and corrosion. Preferably, but not exclusively, the HVOF process is carried out at a gas temperature comprised between 2600 and 3000° C., at a spray rate comprised between 1 and 9 Kg/h, and at a particle velocity ≤700 m/s.

However, other deposition techniques, such as Plasma, Electric arc wire, Flame spray, and Combustion powder can also be used in a process of the invention.

Successively, after the deposition step, possible excess of coating material is removed from the surface of the coating in a finishing step. This step aims at optimizing the profile of the modified body shaping portion and/or to bring the surface roughness to the needed final value, which is preferably the same roughness magnitude of the surface of the pre-existing core rod. Indeed, it is preferred that the modified surface 34 is as similar as possible to the original surface 14, but with greater dimensions, in particular with greater external diameter. In other words, it is preferred that the profile of the final surface 34 is as similar as possible, and preferably parallel, to the profile of the original surface 14.

Some of the effects achieved in this step can be seen in the portion of the core rod shown in FIG. 7, which has an optimized profile as compared to that of FIGS. 5 and 6. Indeed, in FIGS. 5 and 6, excess coating material 44 can be seen above the intended final surface 34. The area enclosed between the intermediate surface 24 and the final surface 34 represents the final metal coating.

The removal of the excess material 44 can optionally be performed so that an amount of the excess material is removed to obtain a part of the coating proximal to portion 26 which has final diametrical dimensions smaller than the initial diametrical dimensions (FIG. 5).

When part 25, which is adjacent to the intermediate surface 24, is left unchanged in the first step, as described above, preferably in the finishing operation there is provided also a removal of material from such part 25 of the body shaping portion. Therefore, at part 25, the initial diametrical dimensions of the core rod are greater than the final diametrical dimensions (FIG. 5). According to the invention, the thickness of the coating after the removal of the excess material is between 0.04 mm and 2.5 mm, preferably.

In the embodiment shown in FIG. 7, the thickness of the coating gradually increases from line 28 for a longitudinal portion. After that, the thickness of the coating becomes substantially constant.

In the finishing step, sandblasting on the final surface 34 of the body shaping portion is preferably, but not necessarily, performed to ease the de-moulding of the preforms during the injection process. Even more preferably, part of the body shaping portion which is distal from the neck shaping portion is subject to sandblasting, and a different part of the body shaping portion which is proximal to the neck shaping portion is subject to polishing. For example, the part subject to polishing extends for 5 or 6 mm from line 28, and the remainder part of the body shaping portion is subject to sandblasting. Such a differentiation of finishing treatment is preferred because sandblasting might induce residual stresses that can make the coating more fragile or might cause delamination of the coating. It is understood that polishing and/or sandblasting are performed on the coating, since it is the outermost layer of the body shaping portion, having the final surface 34, at this stage.

It is also preferred, but not necessary, that the metal coating has a porosity percentage lower than 2%.

The modified core rod is particularly adapted to produce a preform made of thermoplastic material, for example PET. Such preform will be successively blown to produce a container, such as a bottle for potable liquids. By way of non limiting example, the bottle can have a volume capacity comprised between 0.2 L and 30 L.

The invention claimed is:

1. A process to make a core rod for preforms, wherein there is provided
    a core rod having an external moulding surface being a shaping surface of an internal surface of a preform and comprising a neck shaping portion and a body shaping portion, the body shaping portion having first diametrical dimensions,
    a metallic compound,
    depositing means to deposit said metallic compound onto the core rod, and
    chip removal means,
the process comprising the steps of:
a) removing an outer layer of a predetermined first thickness from the body shaping portion by means of the chip removal means to obtain an intermediate surface;

b) depositing a layer of said metallic compound of a second thickness greater than said first thickness onto the intermediate surface, c) performing a surface finishing operation to remove an excess of coating material and/or to bring the coated surface to a predetermined superficial roughness, whereby the body shaping portion is provided with a coating of said metallic compound so that the core rod has a final body shaping portion with second diametrical dimensions greater than said first diametrical dimensions.

2. The process according to claim 1, wherein said coating has a thickness comprised between 0.04 mm and 2.5 mm.

3. The process according to claim 1, wherein the metallic compound is chromium steel, preferably stainless steel.

4. The process according to claim 1, wherein the metallic compound is Mo or CoCrW or NiCrMoW or NiCrMoNb or NiCrBSiFe or WC—Co or WC—CoCr or Wc-Ni.

5. The process according to claim 1, wherein in step b), the metallic compound is deposited by means of a spraying or sputtering deposition.

6. The process according to claim 1, wherein the body shaping portion has an original surface, and the intermediate surface has a first portion forming an angle α with the original surface, and a second portion substantially parallel to the original surface.

7. The process according to claim 6, wherein said angle α is comprised between 0 and 90°.

8. The process according to claim 1, wherein after step a) and before step b) a surface treatment of the surface of the body shaping portion is performed in order to increase the roughness of said surface.

9. The process according to claim 1, wherein in step c) the surface finishing operation comprises polishing and/or sandblasting.

10. The process according to claim 1, wherein the second diametrical dimensions are greater than said first diametrical dimensions only for part of the final body shaping portion or for all the final body shaping portion.

11. The process according to claim 1, wherein during step c) in the surface finishing operation there is provided also a removal of material from a part of the body shaping portion which is adjacent to said intermediate surface.

12. The process according to claim 2, wherein the metallic compound is Mo or CoCrW or NiCrMoW or NiCrMoNb or NiCrBSiFe or WC—Co or WC—CoCr or Wc-Ni.

* * * * *